United States Patent [19]
Cherukuri et al.

[11] Patent Number: 5,876,506
[45] Date of Patent: Mar. 2, 1999

[54] MESOMORPHIC SUGAR AND PRODUCTS THEREFROM

[75] Inventors: Subraman R. Cherukuri, Fairfax; Jose F. Zamudio-Tena, Centreville, both of Va.; Robert K. Yang, Flushing, N.Y.; Garry L. Myers, Centreville, Va.; Andrea S. Blake, Chantilly, Va.; Paul M. Croushorn, Sumerduck, Va.

[73] Assignee: Fuisz Technologies Ltd., Chantilly, Va.

[21] Appl. No.: 909,517

[22] Filed: Aug. 12, 1997

[51] Int. Cl.⁶ .................................. C13F 1/02; C13F 3/00
[52] U.S. Cl. ................................. 127/63; 127/30
[58] Field of Search ......................... 127/30, 63

[56] References Cited

U.S. PATENT DOCUMENTS 5,518,551  5/1996  Battist et al. .............................. 127/58
5,593,502  1/1997  Fuisz et al. ................................ 127/30
5,597,416  1/1997  Fuisz et al. ................................ 127/30
5,601,076  2/1997  Battist et al. ............................. 127/58

FOREIGN PATENT DOCUMENTS 63-313600  12/1988  Japan ....................................... 127/63

Primary Examiner—David Brunsman
Attorney, Agent, or Firm—John F. Levis

[57] ABSTRACT

The present invention is a new mesomorphic polycrystallite product and a process for making the same. In the present invention amorphous sugar is transformed to a mesomorphic product having polycrystallites therein by a completely anhydrous process rather than by hydrating and then dehydrating the sugar. The product of the present invention is unique in shape and size, and possesses a high degree of uniformity. The properties of the polycrystallite make it possible to replace some or all of the fat in comestibles such as frostings and fillings and to provide fondants of extraordinarily fine grain.

30 Claims, 1 Drawing Sheet

MESOMORPHIC SUGAR AND PRODUCTS THEREFROM

This application is filed on the same day as co-pending patent application "MESOMORPHIC SUGAR PRODUCTS" by Cherukuri et al.

BACKGROUND OF THE INVENTION

The present invention relates to sugar products and, in particular, to a new structural forms of sugar and edible composition made with this form of sugar.

Crystallization is one of the oldest industrial chemical transformation processes known. Vast quantities of crystalline substances are produced for commercial purposes, i.e., in excess of 100 million (10%) metric tons per year. One of the most common products prepared by crystallization is sugar.

Crystallization of sugar is a complex process. The growth of crystals involves simultaneous transfer of heat and mass in a multi-phase, multi-component system. While the coexistence of these conditions alone presents complex control problems, fluid and particle mechanics and thermodynamic instability create further complications.

Conventional wisdom in the science of sugars teaches crystallization by supersaturation. Supersaturation requires removal of water from a solution to increase solute concentration beyond that characteristic of equilibrium. Cooling, evaporating, and precipitating are used. Manufacturing procedures for crystallizing sugar are heat and energy intensive. Moreover, nucleation of sugar crystals during supersaturation is relatively uncontrollable. Consequently, the size and shape of the resulting crystals are unpredictable.

The drawbacks of known sugar manufacturing procedures are especially manifested when preparing sugar having reduced-size crystals. Reduced-size crystalline sugar product is referred to herein as microcrystalline sugar. Individual particles of microcrystalline product are typically no greater than 50 micrometers ($\mu$m).

Classification of crystallizers known in the industry follows the methods by which supersaturation is achieved. The technical aspects of procedures used for sugar crystallization are well documented, and they are generally high-energy procedures.

For example, one method of manufacturing reduced-size crystals involves grinding and sieving crystalline sugar. Grinding is energy intensive. Moreover, fracturing sugar results in a wide distribution of sizes of ground sugar crystals. The large crystals must be reground and sieved. Much of the product is lost as fines. Thus, grinding and sieving is expensive and inefficient.

U.S. Pat. No. 3,981,739 to Dmitrovsky et al discloses preparation of crystalline sugar from solution by (1) concentrating a solute in the presence of seed crystals added thereto, followed by (2) further removal of solvent through heating and evaporation of the stream resulting from the first stage concentration. This energy intensive procedure produces sugar crystals having an average size in the range of 325–425 $\mu$m. The Dmitrovsky et al '739 disclosure is a solution process that relies on nucleation by addition of seed crystals while concentrating by high heat and vacuum evaporation. The same procedure is disclosed in U.S. Pat. No. 4,056,364 to Dmitrovsky et al.

U.S. Pat. No. 4,159,210 to Chen et al describes a method for preparing crystallized maple sugar product by (1) concentrating maple syrup to a solids content of about 93–98 weight percent (wt%) in the presence of heat and partial vacuum, and (2) impact heating until transformation and crystallization of the syrup occur. The product may then be cooled, milled and screened to a suitable size range. The Chen et al '210 procedure is energy intensive, relies on "beating" to induce nucleation of the crystals, and calls for subsequent milling to obtain reduced-size crystals.

In U.S. Pat. No. 4,362,757 to Chen et al a crystallized sugar product and a method of preparing same are described. The method disclosed in the Chen et al '757 reference includes concentrating sugar syrups to a solids content of about 95 wt % to about 98 wt % by heating to a temperature of about 255° F. to about 300° F. The resulting concentrated syrup is maintained at a temperature of about 240° F. in order to prevent premature crystallization. A premix consisting of an active ingredient (e.g., a volatile flavor, an enzyme, an acidic substance such as ascorbic acid, a fruit juice concentrate, or a high invert sugar substance) is mixed with the concentrated sugar syrup. The combination is subjected to impact heating until a crystallized sugar product made up of fondant-size sucrose crystals and the active ingredient is formed that has a moisture content of less than 2.5 wt %. The Chen et al '757 process required heat intensive concentrating and heating for nucleation.

U.S. Pat. No. 3,365,331 to Miller and U.S. Pat. Nos. 4,338,350 and 4,362,757 describe a process for crystallizing sugar which involves impact beating a sugar solution to provide nucleation. The process involves input of a considerable amount of energy and has problems directly related to temperature control.

Other disclosures include British Patent Specification No. 1 460 416 and U.S. Pat. No. 3,972,275 (Tate & Lyle Limited), which disclose a continuous process wherein a syrup solution is catastrophically nucleated and discharged into a crystallization zone. Catastrophic nucleation is achieved by subjecting the solution to shear force that can be applied in apparatus such as a colloid mill or homogenizer. The solution is discharged onto a moving band where the water must be boiled off by maintaining the material at a relatively high temperature. A related process has been disclosed in British Patent Specification 2 070 015 B and U.S. Pat. No. 4,342,603, which is used for crystallization of glucose. In the disclosed procedure a supersaturated solution is subjected to shear force and allowed to crystallize on a belt. Both the sucrose process and the glucose process require solution processing at high temperatures and are, consequently, energy intensive.

U. K. Patent Specification GB 2 155 934 B of Shukla et al discloses a method for crystallizing sucrose or glucose from a solution. Shukla et al subject a sugar solution to evaporation to produce a supersaturated sugar solution. The supersaturated solution is then subjected to shear in a continuous screw extruder to induce nucleation. The retention time of the syrup is below 25 seconds (on the average) at a temperature of 155° C. to 145° C. (239° F. to 293° F.) for sucrose, and 100° C. to 135° C. (215° F. to 275° F.) for glucose. After the syrup is subjected to progressive nucleation, Shukla et al pass the syrup onto a moving band to permit crystallization to continue at a gradual rate at a relatively high temperature. The Shukla et al process requires maintenance of the solution at temperatures that do not drop below the boiling point of water.

U.S. Pat. No. 3,615,671 to Shoaf discloses a method of producing food products by encasing dry particular food particles within a casing of spun sugar filaments. In order to enhance (1) shaping of the fibers and particles and (2) the tendency of the fibers to stick to each other with a minimum of compression, Shoaf uses a humectant in the sugar mix to be spun and controls the relative humidity of the gases surrounding the filaments as they are spun. The humectants described as useful are as follows: invert syrup or corn syrups and polyhydric alcohols, e.g., sorbitol, glycerol and pentahydric alcohols, e.g., xylitol. Shoaf is concerned with preventing crystallization of the spun sugar in order to enable the manufacturer to encase dry food particles by wrapping and compressing filaments of the spun sugar around the particles.

More recently, a trade brochure provided by Domino Sugar Corporation, Industrial Products, entitled "Co-Crystallization" (undated) describes a product in which microsized crystals form aggregates having a second ingredient disposed over the surface of each aggregate. The process for producing this new product requires that all starting materials must be in a liquid state. Therefore, solvent must be driven off by heat and/or vacuum in order to concentrate the syrup for crystalline growth. As in other solution processes, energy is required to transform the sugar to microsized crystals.

Inherent in the procedures set forth above, as well as other procedures known in the art, is the technical philosophy of dehydration to promote crystallization. Supersaturation, pan drying, and nucleation by agitation or chemical reaction depend on the principle of eliminating water to form crystals. A common difficulty with crystallization based on this technical underpinning has been lack of control over crystalline growth.

Another method of making microcrystalline sugar is disclosed in U.S. Pat. No. 5,518,551 and 5,601,076 to Battist et al. This method requires the addition of amorphous sugar to a large volume excess of a liquid that is mostly a liquid in which sugar is not soluble. This liquid preferably contains a solvent for the sugar, i.e., water, which is said to contribute significantly to the formation of crystals. The resulting produce is distinctively spheroidal wherein smaller crystals are arranged in a "helical" pattern. This method produces a viable product with small crystals, but the method requires relatively large amounts of organic liquids such as ethanol or xylene, which can be problematic to handle both with respect to flammability and environmentally acceptable disposal. Moreover, removal of the large quantities of these organic liquids consumes large amounts of time and energy, and the use of such liquids adds material costs to the process. Even despite such efforts, it can sometimes be difficult to remove trace amounts of the organic liquid, with residual amounts capable of interfering with taste when the crystal product is used in foods.

Thus, it would be a significant advance in the art of crystallization to provide a mechanism for crystal formation which departs from traditional dehydration and that provides a low energy means for producing a crystalline sugar product.

Accordingly, it is an object of the present invention to enable the artisan to make a sugar product which has a predictable and uniform crystal size without energy-intensive procedures. Other objects and surprising new sugar/crystal technology are disclosed in the remainder of the specification.

SUMMARY OF THE INVENTION

The present invention provides a new structural form of sugar. The new "mesomorphic" form of sugar comprises a substantially disordered or randomized macrostructure and a crystalline microstructure composed of innumerable crystallite structures. The crystallite structures, in turn, are made of sugar crystallites which are quite small, i.e., of order approximately $10^{-5}$ meter or less, and are quite uniform in size.

The polycrystallite structures of the mesomorphic structure can be disintegrated and the component crystallites themselves can be monodispersed. To obtain as a separate product the crystallites which combine to form the polycrystallite structure, the polycrystallites of the mesomorphic sugar structure are disintegrated. This is achieved by contacting the mesomorphic material with a sugar solution, preferably a sugar-saturated liquid, e.g., a solution of about 60–67 wt % sugar such as sucrose. The resulting monodispersed crystallites are highly dimensionally uniform, with a particle size of order approximately $10^{-5}$ meter (10 $\mu$m) or even smaller. A higher or lower percentage of sucrose in the saturated liquid may also serve to bring forth the monodispersed polycrystallite material, and the skilled artisan can determine the optimum percentage range. In addition, those skilled in the art may also discover that other saccharide materials, and possibly additional materials, in a saturated liquid can be utilized to obtain the polycrystallites of the invention. The amount of sucrose saturated liquid necessary to release the polycrystallites will vary, but is typically within the range of about 20 wt % or greater.

In one embodiment the invention is a method of making a sugar product comprising contacting amorphous sugar with a nonsolvent crystallization promoter substantially without any added sugar solvent, said crystallization promoter being made available to said amorphous sugar at a rate and in an amount which provides a mesomorphic sugar having randomized polycrystallite structure.

The method can further comprise first providing the amorphous sugar by flash-flow processing a sugar-containing feedstock, or by liquiflash conditioning, which produces amorphous yet spheroidal sugar particles. For example, the flash-flow processing can comprise subjecting a feedstock having a sugar carrier to shear created by high-speed spinning on a spinning head which casts material outwardly, wherein the feedstock is subjected to heating and shear in said head sufficient to create flash flow in said sugar carrier. This type of flash-flow processing is referred to as "flash heat." Alternatively, the flash-flow processing can comprise heating a non-solubilized feedstock having a sugar carrier sufficiently to provide internal flow in said sugar carrier, ejecting said feedstock while said sugar has said internal flow condition, and subjecting said feedstock to disruptive fluid shear force to form multiple masses of carrier. This type of flash-flow processing is referred to as "flash shear."

Additionally the amorphous sugar can be produced by technology known as "liquiflash processing." This technology is set forth and claimed in recently allowed U.S. application Ser. No. 08/330,412 filed Oct. 28, 1994, by Myers et al, incorporated herein by reference. Briefly described, this method involves subjecting feedstock material in the substantial absence of dissolving medium to conditions of centrifugal force and temperature which transform the feedstock from a solid to a liquid and back to a solid so as to provide substantially unimpeded internal flow of the feedstock while liquified. The entire transformation is preferably over in less than about five seconds, and usually in much less time. While the feedstock is liquified shear force is applied thereto in an amount sufficient to separate discrete particles of the feedstock by natural mass separation. The action of shear force against the particles is occurring while the liquified feedstock is in an unimpeded flow condition. When the liquid solidifies a solid microsphere is formed.

It is also within the scope of the invention to utilize amorphous sugar from other sources in addition to any of the foregoing.

The amorphous sugar can further comprise an additive whereby said additive is then co-crystallized in said randomized polycrystallite structures as a result of the method of the invention. Such additives are preferably materials which can be integrated into the amorphous sugar without reducing the amorphism of the sugar and without subsequently deteriorating the randomized polycrystallite structures. For example, the additive can be selected from the non-limiting group consisting of flavorants, bio-affecting agents, dyes, fragrances, food products, food ingredients, and other compatible substances. The amorphous sugar may further contain a surfactant.

It is the amorphous sugar, with or without one or more of the foregoing additives, which is then contacted with the crystallization promoter. Chopping or mincing of the amorphous sugar either before, or as it is contacted with the promoter is very often a desirable way to expedite the crystallization process. Use of a small- or large-scale blender or mixer can assist in breaking down the amorphous sugar mass.

In the method the crystallization promoter can further comprise an additive that co-crystallizes with the amorphous sugar to form the polycrystallites of the mesomorphic sugar structure. Again, the additive is preferably selected from the non-limiting group consisting of flavorants bio-affecting agents, dyes, fragrances, food products, food ingredients, and other compatible substances. More preferably the additive is a bio-affecting agent selected from inhalants.

The method can be used to produce a mesomorphic product in which the mean diameter of said randomized polycrystallite structures present therein are not greater than about 200 μm.

The crystallization promoter is desirably maintained at a temperature of not less than about −20° C. A highly preferred crystallization promoter is ethanol. Other suitable promoters include, for example, xylene, acetone, benzene, other alcohols and hydrocarbons, as well as esters, aldehydes, ketones, polyols, etc., and any combination of any of the foregoing. Even flavor oils such as for example, peppermint and spearmint, as well as the many other flavor oils available to the food scientist, can be utilized as crystallization promoters. In some instances, those non-solvent crystallization promoters with a hydroxyl (—OH) group will be advantageously utilized in the method of the invention. The crystallization promoter is non-solvent in the sense that the sugar will not dissolve therein or at best is only minimally dissoluble, hereinafter defined, therein. The promoter is also preferably anhydrous,i.e. is substantially free of known sugar solvents such as water which are currently used in the art. The inclusion of water in the crystallization promoter can often result in the formation of crystals which are much larger than 50 μm. It has also now been discovered that the use of any of the foregoing non-solvent crystallization promoters in gaseous form, e.g. as vapors, such as, for example, anhydrous ethanol vapor can also be utilized to crystallize the amorphous sugar feedstock into the mesomorphic product of the invention.

The method can further comprise disintegrating the polycrystallite structures formed above to yield crystallites. Preferably, the disintegrating step comprises contacting the mesomorphic product's polycrystallite structures with an essentially sugar-saturated aqueous liquid. The resulting crystallites have an average crystal diameter no greater than about 10 μm, and more preferably no greater than about 5 μm, or even smaller.

In another embodiment the invention is a mesomorphic sugar product made up of a randomized polycrystallite structure comprising a multiplicity of sugar crystallites. The mesomorphic sugar product is preferably produced by the method of the invention. Thus, the randomized polycrystallite structure can be produced by contacting amorphous sugar with a crystallization promoter substantially free of solvent wherein the crystallization promoter is made available to the amorphous sugar at a rate and in an amount sufficient to form said randomized polycrystallite structure. Preferably, the amorphous sugar is shearform product produced by flash shear methods. It is also highly desirable that the amorphous sugar be produced under flash heat or liqui-flash conditions. Further, it is preferred that the crystallization promoter be ethanol, either in liquid form or as a vapor.

In the mesomorphic sugar product the sugar crystallites are preferably microcrystalline. Generally, the microcrystalline sugar crystallites have an average crystal size no greater than about 10 μm, more preferably no greater than about 5 μm, or even smaller.

The mesomorphic sugar product can further comprise an additive co-crystallized in said crystallites. For example, as noted above, the additive may be selected from the group consisting of flavorants, bio-affecting agents, dyes, fragrances, food products, food ingredients, and other compatible agents. The additive may also be a surfactant. The additive is preferably included as part of the amorphous sugar feedstock or with the crystallization promoter.

In another embodiment the invention is monodispersed sugar crystallites produced by disintegrating mesomorphic sugar product having a polycrystallite structure. The polycrystallite structure of the mesomorph is first prepared by contacting amorphous sugar with a crystallization promoter substantially free of solvent, wherein said crystallization promoter is made available to said amorphous sugar at rate and in an amount sufficient to form said structure. The disintegrating process then comprises contacting said mesomorphic polycrystallite structures with an essentially sugar-saturated liquid.

In still another embodiment the invention is a fondant composition comprising a mesomorphic sugar product having a randomized polycrystallite structure. Also, the invention is a fondant composition comprising monodispersed sugar crystallites obtained by disintegrating a mesomorphic sugar product having a randomized polycrystallite structure. Preferably, the fondant composition comprises from about 30 wt % to about 70 wt % randomized polycrystallite structure, from about 20 wt % to about 70 wt % sugar solution, and from 0 wt % to about 10 wt % combined weight of at least one member selected from the group consisting of gum, humectant, fat, flavorant, and combination thereof to form 100 wt % composition. More preferably, the fondant composition comprises from 0 wt % to about 10 wt % gum, from 0 wt % to about 10 wt humectant, from 0 wt % to about 2 wt % flavor, and from 0 wt % to about 20 wt % fat.

The invention is also a method of making a fondant composition comprising mixing an ingredient selected from the group consisting of a mesomorphic sugar product having a randomized polycrystallite structure, monodispersed sugar crystallites obtained from disintegration of said randomized polycrystallite structure making up the mesomorphic sugar, and combinations thereof with other fondant ingredients, whereby said fondant product is provided.

Moreover, in another embodiment the invention is a mesomorphic material resulting from the process comprising contacting an amorphous solid form of a crystallizable material with a crystallization promoter substantially free of solvent, wherein said crystallization promoter is made available to said amorphous crystallizable material at a rate and in an amount sufficient to form said structure.

In still another embodiment the invention is a comestible composition for use with baked edible food products comprising a mesomorphic polycrystallite sugar product and at least one other ingredient selected from the group consisting of gums, humectants, fats, flavors, and combinations thereof. Moreover, there is provided a comestible composition for use with baked edible food products comprising monodispersed sugar crystallites and at least one other ingredient selected from the group consisting of gums, humectants, fats, flavors, and combinations thereof wherein said monodispersed sugar crystallites are provided by disintegrating a mesomorphic sugar product having randomized crystalline structure. For example, there is provided a baked food product comprising:

A. A baked portion; and
B. A composition comprising
  (i) A sugar portion selected from the group consisting of a mesomorphic polycrystallite sugar, monodispersed sugar crystallites obtained by disintegrating mesomorphic polycrystallite sugar, and a combination thereof; and
  (ii) At least one ingredient selected from the group consisting of gums, humectants, fats, flavors and mixtures thereof.

For a better understanding of the present invention, reference is made to the Drawings, the following Detailed Description , and non-limiting examples. The scope of the invention is descried in the claims which follow the Detailed Description.

DETAILED DESCRIPTION OF THE INVENTION

Figure 1:
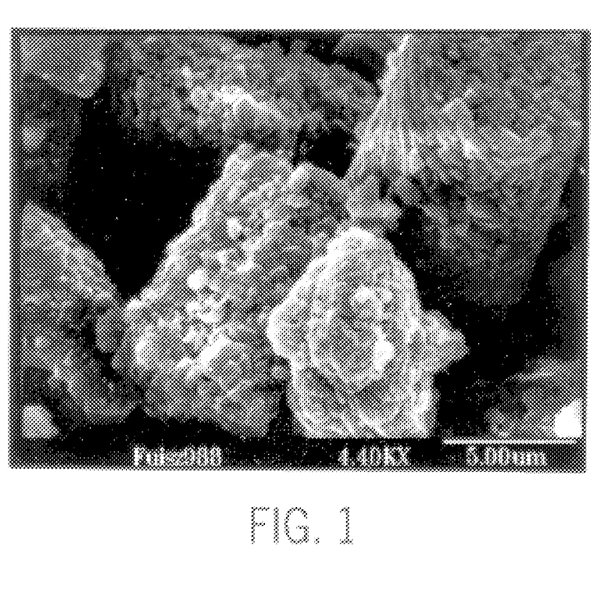
FIG. 1 is a scanning electron micrograph of the unique mesomorphic sugar product of the present invention illustrating the component polycrystallites and their randomized distribution in the mesomorphic structure.

Referring now to the drawings, and in particular to FIG. 1, in one embodiment the present invention is a new structural form of sugar which comprises a short-range microcrystalline structure as part of a long-range randomized structure. This new structure or morphology is termed "mesomorphic" structure and differs substantially from conventional crystalline sugar, and is further differentiated from amorphous sugar. By "mesomorphic" is meant that the structure presents a unique morphology that can be described as intermediate crystalline and amorphous, hence the prefix "meso-." In particular, the mesomorphic material of the invention is characterized by a randomized long-range macrostructure and a crystalline microstructure. The macrostructure includes non-periodic structures which have dimensions greater than about $10^{-5}$ m, while the microstructure includes crystalline structure which have dimensions of about $10^{-5}$ m or less. These features of the mesomorphic material of the invention are nicely displayed in FIG. 1, which is a scanning micrograph of the mesomorphic sugar produced in accordance with the present invention shown at 3000× magnification.

Many of the macrostructural features of the material of the invention will be completely random, lacking any long-range periodicity whatsoever. Some of the macrostructure, however, may resemble a randomized trabecular structure resembling seamlessly-joined spars of random lengths and cross sections, defining spaces of random dimension and orientation. For example, such macrostructural features are displayed in FIG. 1.

The mesomorphic material can also be described at a more microscopic level as comprising innumerable crystallite bodies, each of which individually presents the periodic structure characteristic of crystals, but at a gross dimension far smaller than that of conventional refined sugars. These crystallite structures may, therefore, be characterized as microcrystalline. Moreover, the crystallite units are integrated into the mesomorphic material, but substantially without imposed order. That is, there is substantially no inter-crystallite symmetry or periodicity. Because of the extraordinarily large number of microcrystallites in the mesomorphic material, it can be termed "polycrystallite." Accordingly, the term "mesomorphic" is intended to include all such polycrystallite structure which possess a randomized macrostructure.

The mesomorphic material of the invention is distinguished from previously known forms of sugar. Classically, sugar is purely crystalline in form, having regular short-range and long-range periodicity and other physical hallmarks of crystalline materials such as a discrete melting point. Amorphous sugar has also been known, lacking substantial crystallinity and substantially lacking in periodicity or regularity of structure. Amorphous sugar might be characterized as a glassy material. See, for example, U.S. Pat. No. 5,206,355 to Richards et al. Other forms of sugar as known as, for example, the spheroidal sugar structures in recently-allowed U.S. patent application Ser. No. 08/330, 412; but the product material of the invention does not correspond to these conventional structural categories.

The term polycrystallite is meant to describe the mesomorphic material of the invention as being composed of many tiny crystallites. Upon microscopic inspection of the mesomorphic structures one can detect the individual tiny crystallites, and again reference is made to FIG. 1. The dimensions of these crystallites are of order $10^{-5}$m or less, i.e., less than about 10 μm, and preferably less than about 5 μm. (The mesomorphic polycrystallite material, in turn, can be disintegrated to release the crystallites. For example, crystallites can be released by contact with a saturated sugar solution, as further described hereinbelow.)

The mesomorphic polycrystallite product has been found to be ideal for formation of numerous comestible products such as fondants, e.g., cake icing, confectionery fillings, coated candy fondants (such as chocolate coated), etc. The extraordinary fineness of the crystallites, as well as the rapid dispersibility from the mesomorphic form, permit easy manufacture of comestible products with unusually high smoothness. This contrasts with the graininess of texture which so commonly affects products made even with confectioner's sugar (6×) and other products of similar granularity. In addition to the smoothness imparted to the products by the mesomorphic material, the properties of the polycrystallite sugar surprisingly impact to the resulting product a mouth-feel normally associated with added fat components. Thus, inasmuch as the caloric content of sugar is much lower than that of fat, the mesomorphic product is ideal for replacing at least some, if not all, of the fat in comestibles such as frostings, fillings, etc. The organoleptic sensations created by fat are closely emulated or replaced or even exceeded by the use of the present product.

As previously explained, crystalline sugar prepared by methods known in the art result in a wide variety of crystal sizes. This is due to many factors, all of which contribute to the basic lack of control over the nucleation and growth of crystals. In the present invention, however, the new mesomorphic polycrystallite structures are grown to comprise individual crystallites of a predictably uniform size.

"Monodispersed," as used herein, means that at least about 60 wt %, preferably at least 80 wt %, and most preferably at least 90 wt %, of the crystals have a largest diameter which is within 60% of the mean crystal diameter. Crystal diameter is that dimension which is the greatest straight-line dimension in the largest plane taken through a three-dimensional crystal. If one considers a crystal having three dimensions (x, y, and z), the crystal diameter is the greatest straight-line dimension in the largest plane through the crystal. In yet a further preferred embodiment, monodispersibility means that at least 60% of the crystals are within 50% of the mean crystal diameter; and in a most preferred embodiment, within 40% of the mean crystal diameter. In view of the fact that such a significant percentage of the crystals can be grown to within a very uniform size range, substantial advantages are obtained in the use of the product.

The process of the present invention is quite unique in that it employs a procedure directly opposite from the classic teaching of the sugar technology, which is to form a crystal by concentration and/or supersaturating sugar from a solution. The present invention employs a procedure which specifically avoids any addition of a sugar solvent such as water. Applicants have found that added water can interfere with the unique mesomorphic structures and unique crystallite growth described herein. In addition, as further described herein, the method of the invention employs considerably less crystallization promoter than was previously thought necessary. This, in turn, translates into less crystallization promoter which must be driven off to derive the unique product of the invention. Less crystallization promoter in the final product means less that may affect the organoleptic properties thereof.

Contrary to the teachings in the art of sugar crystallization, the new sugar product is prepared in accordance with the present invention by adding a fractional volume of a crystallization promoter, i.e., a nonsolvent liquid or vapor, to amorphous sugar. "Amorphous sugar," as used herein, means a sugar feedstock containing a high percentage of amorphism, i.e., greater than 50 wt % and preferably greater than 70 wt % of the sugar stock is amorphous.

The unique procedure of this invention includes contacting amorphous sugar with a crystallization promoter, i.e., a non-aqueous sugar-nondissoluble liquid or gaseous vapor, so that the crystallization promoter is made available to the amorphous sugar at a controlled rate and in an amount that permits growth of the polycrystallite structures comprising the mesomorphic sugar product. In some instances it may be preferred to combine approximately 20% to 25% of the total amorphous sugar with about 25% to 35% of the nonsolvent promoter to initiate the crystallization process. As powder appears, indicating that crystallization is occurring, the remaining amorphous sugar feedstock can be combined with the remaining solvent at an approximately constant ratio. At this rate it should be possible to crystallize about 7 kg of amorphous sugar feedstock in about 10–20 minutes using about 350 grams of absolute ethanol or less. Care should be taken so that floss is continuously added to avoid driving off the crystallization promoter with which it must contact. Those skilled in the art may, of course, alter the foregoing parameters to optimize the crystallization process. While crystallization is occurring, it is again recommended to use a utensil such as a blade to keep the sugar feedstock in contact with the nonsolvent.

The crystallization promoter is added to the amorphous sugar in a relatively minor amount, i.e., in an amount which is less than about 50 wt % based on the weight of the sugar. Thus, for 100 pounds of sugar, less than about 50 pounds of the crystallization promoter are added. It is preferred to use even substantially less crystallization promoter, with about 10 wt % being highly preferred. Especially desirable is adding crystallization promoter in amounts less than about 5 wt %, or even lower. When the crystallization promoter is a non-solvent gaseous vapor, it is possible to utilize about 1–2 wt % or even less. This represents a substantial advance in the state of the art when previously it was thought an extremely large access of crystallization promoter, often on the order of 10–15× and up to 100× the weight amount of sugar, was necessary.

Because such a small proportion of the combined crystallization promoter/amorphous sugar mixture is liquid, the mixture remains substantially solid through the preparation procedure. The two components are mixed by conventional mixing apparatus to circulate the components and to bring them into "recycling" contact with one another. The term "recycling" is intended to relate that the crystallization promoter is not consumed by the process of the invention, but acts as a "catalyst," to promote the formation of the mesomorphic material. As a "catalyst" the crystallization promoter can be continuously recycled to participate in crystallite formation in different places at different times within the mass of the mixture being processed. It is not believed that the crystallization promoter induces any chemical change in the resulting mesomorphic material. Thus, the crystallization promoter is not a typical catalyst, yet the crystallization promoter does enable and facilitate the mesomorphic conversion process and can even be recovered unchanged following the process.

Those skilled in the art will further discover that chopping, milling, and/or mincing of the amorphous sugar feedstock, either before or as it is contacted with the crystallization promoter, will aid in the process of crystallization. The use of a knife, blender, or mixer is therefore desirable to further condition the amorphous sugar. A high shear mixer can be particularly helpful in this regard. One high shear rotor stator such as Janke & Kunkel IDA Ultra-Turrax T25 may considerably improve the production of very small size sugar polycrystallites. The rotor stator acts to mill the amorphous sugar microparticles (microspheres which are about 300 microns in size when prepared under liquiflash conditions) to thereby increase the surface area, and adds shear to increase the solid-liquid contact so as to decrease the crystallization time and greatly simplify the crystallization process.

It is a further advantage of the invention that virtually all of the crystallization promoter can be recovered, typically by volatilization, leaving substantially none of the promoter in the final mesomorphic material. As a result, the mesomorphic material typically presents a taste substantially untainted by the promoter liquid or gaseous vapor. Comestible products made using the mesomorphic material are, therefore, substantially free of off-notes, making the mesomorphic sugar an unusually fine and desirable component in such products.

While the present invention primarily concerns sugars as defined herein, it is also intended to include processing (and products therefrom) any amorphous solid form of a compound which is capable of forming crystals. Such compounds may include lactose, dextrose, polydextrose, maltodextrins, etc., e.g., other mono- and di- and oligosaccharides. Other examples of such compounds include inulin, sorbitol, and palantient marketed under the trademark Isomal. The intensive sweeteners, for example, aspartame, alitane (Pfizer) and sucrolose (Johnson & Johnson) may also be included as part of the material which is processed to yield the amorphous feedstock. Any blends of two or more of any of the foregoing compounds, with or without sucrose, are also intended to be included as part of the invention. In addition, in some embodiments the amorphous feedstock to be crystallized may contain up to about 70 wt % of an edible acid-based compound, more preferably up to about 50 wt %, even more desirably about 15–35 wt %, with 20–25 wt % being especially preferred. Such edible acid compounds can be selected, for example, from the non-limiting list of compounds such as the citrates, ascorbates, lactates, succinates, tartarates, as well as fumaric, adipic, maleic acid derived compounds etc. The benefits associated with extraordinarily small crystallites, easy dispersibility, and low residual amounts of the crystallization promoter are found in these alterative materials processed according to the invention.

The method of the invention employs a crystallization promoter in which the amorphous material does not dissolve, i.e., a "nonsolvent." A "nonsolvent" liquid means a liquid containing substantially no water and in which the amorphous material does not dissolve, i.e., less than one gram (1 g) of the amorphous material will dissolve in 50 milliliters (50 mL) of the liquid. One such nonsolvent liquid is ethanol. The nonsolvent crystallization promoter can comprise a blend of two or more of any of the nonsolvents herein set forth.

The skilled artisan will appreciate that numerous liquids, often considered to be "solvents" in other contexts, will qualify as nonsolvent crystallization promoters if their properties and the properties of the amorphous materials with which they are used are compatible as defined. Thus, the artisan can employ available resources to evaluate whether a liquid can be employed as a crystallization promoter rather than a solvent for the amorphous material desired to be made mesomorphic. Preferably, the crystallization promoter for the process and product herein is ethanol. Especially in the context of sugar, however, it is expected that other materials can be used such as other alcohols (e.g. methanol, propanol, butanol, pentanol, benzyl alcohol etc.), other hydrocarbons like benzene, acetone, xylene and the like, as well as mixtures of any of the foregoing. It is preferred that the crystallization promoter be substantially non-toxic in those applications designed to yield a comestible product. It is also highly preferred that the non-solvent crystallization promoter be substantially free of moisture. While water may speed up the crystallization process, it often results in the formation of polycrystallites which exceed 50 microns. It may also be desirable to utilize non-solvents having a relatively high dielectric constant. Typically, the higher the constant the faster the rate of crystallization. Non-solvents having a high dielectric constant and also a high viscosity are somewhat less preferred, however, because highly viscous liquids can be somewhat more difficult to work with.

It has also now been discovered that any of the foregoing non-solvents in vapor form can also be used as crystallization promoters. In this regard, anhydrous ethanol vapor when wafted over the amorphous sugar can be especially desirable in the crystallization process. Other non-solvents (mentioned above as liquids) or combinations of two or more non-solvents in their gaseous vapor form may also be utilized.

The present invention involves the use of ambient systems which include a nonsolvent liquid or gaseous vapor. In all cases herein the components possess their salient characteristics, i.e., nondissolubility characteristics, at about room temperature, e.g., about 28° C. to 32° C.

Amorphous sugar suitable for use in the method of the present invention can be provided by shearform processing a sugar-containing feedstock. A shearform process according to the present invention is one in which a feedstock is subject to shear and heat simultaneously in order to obtain flash flow. One shearform process includes subjecting a feedstock containing sugar to shear created by high-speed spinning on a spinning head. The spinning head casts the material outwardly as the feedstock undergoes flash flow. Flash flow is created as a consequence of the simultaneous application of heat and shear. An alternative shearform process includes heating a non-solubilized feedstock having a sugar carrier sufficiently to provide internal flow. The feedstock is ejected while the sugar possesses internal flow and is then subjected to disruptive fluid shear force to form multiple masses of carrier. Other methods are contemplated that provide the same critical conditions of heat and shear so that a substantially solid feedstock that contains sugar can be transformed physically and/or chemically from a solid structure to an essentially amorphous solid structure. Another such method would include, for example, liquiflash conditioning as set forth and claimed in co-pending (recently-allowed) U.S. application Ser. No. 08/330,412.

An additive can be included in the amorphous sugar and become part of the resulting mesomorphic structures and the crystallites themselves. This is referred to herein as "co-crystallization." When such an additive is provided it is included without reducing the amorphism of the sugar and without deteriorating the resulting polycrystallites making up the mesomorphic structures. Additives contemplated for use herein include, but are not limited to , flavorants, bio-affecting agents (e.g., drugs), dyes, fragrances, food products, food ingredients, and other compatible agents. Flavorants in the present invention include sweeteners of all types, natural and synthetic.

In a further embodiment of the present invention co-crystallization can be effected by using an additive, especially a bio-affecting agent such as a nucleating agent. This is another mode of co-crystallizing because the non-sugar additive is introduced during crystallization—not during formation of amorphous sugar. The bio-affecting agent is made available in the crystallization promoter (e.g., ethanol) used to initiate the promulgate growth of sugar crystallites from amorphous sugar. Consequently, the bio-affecting agent can actually serve as a nucleating agent. Alternatively, the additive can be dissolved in the crystallization promoter, with deposition into or onto the resulting mesomorphic material in a controlled manner while still permitting removal of the crystallization promoter.

As a further modification to the present invention, the amorphous sugar can be engineered to contain a surfactant, e.g., a surfactant can be included in the feedstock used to manufacture the amorphous sugar. The use of a surface active agent in the feedstock enables the practitioner to exercise even greater control over crystal formation; it has been found that greater uniformity of crystal size is achieved. By using a surfactant, a uniform tiny crystal product can be made with a high degree of predictability. Furthermore, formation of aggregates is inhibited by use pf a surfactant. The preferred surfactant is presently lecithin. Lecithin, or other surfactant composition, can be included in the feedstock in an amount of from about 0.1 wt % to about 5.0 wt %. It is expected that other surface active agents will be identified which enhance the procedure and product of the present invention, and it is intended to include such additional surface active agents within the scope of the claimed invention.

In a preferred embodiment of the present invention the amorphous sugar is provided by flash-flow processing a sugar-containing feedstock. In the present invention amorphous sugar is formed from "sugars." "Sugars" are those substances which are based on simple crystalline mono- and di-saccharide structures, i.e., based on $C_5$(pentose) and $C_6$(hexose) sugar structures. "Sugars" include sucrose, fructose, lactose, maltose, and sugar alcohols such as sorbitol, mannitol, maltitol, etc. The preferred sugar of choice in the present invention is sucrose. As hereinabove set forth, other sugars and other compounds may also be included as part of the feedstock, including edible acids, for example.

A shearform sugar product is a substantially amorphous sugar that results from subjecting sugar to heat and shear sufficient to transform crystalline sugar to amorphous sugar without the use of a solution. Thus, in the sense of the present invention, a shearform sugar product is characterized as a sugar product resulting from a non-solubilized sugar. It can be the starting material for forming the unique mesomorphic polycrystallite product of the present invention. Any amorphous sugar can be used, such as that derived from liquiflash conditioning.

This entire concept is directly contrary to the prior art which specifically teaches the artisan to crystallize sugar by eliminating or dehydrating solvent by driving it off with heat and/or vacuum.

A non-limiting list of bio-affecting agents is as follows: antitussives, antihistamines, decongestants, alkaloids, mineral supplements, laxatives, vitamins, antacids, ion exchange resins, anti-cholesterolemics, anti-lipid agents, antiarrhythmics, antipyretics, analgesics, appetite suppressants, expectorants, anti-anxiety agents, anti-ulcer agents, anti-inflammatory substances, coronary dilators, cerebral dilators, peripheral vasodilators, anti-infectives, psychotropics, antimanics, stimulants, gastrointestinal agents, sedatives, antidiarrheal preparations, anti-anginal drugs, vasodilators, anti-hypertensive drugs, vasoconstrictors, migraine treatments, antibiotics, tranquilizers, anti-psychotics, antitumor drugs, anticoagulants, antithrombotic drugs, hypnotics, anti-emetics, anti-nauseants, anti-convulsants, neuromuscular drugs, hyper- and hypoglycemic agents, thyroid and antithyroid preparations, diuretics, antispasmodics, uterine relaxants, mineral and nutritional additives, antiobesity drugs, anabolic drugs, erythropoietic drugs, antiasthmatics, cough suppressants, mucolytics, anti-uricemic drugs, and mixtures thereof.

The present invention is particularly useful in providing a new delivery system for inhalants. Inhalants must be formed of minute particles which are rapidly absorbed by the patient. Thus, since sugar is quickly dissolved at body temperature, inhalants co-crystallized with the unique tiny highly-uniform product of the present invention can be easily delivered as a tiny particulate that is rapidly absorbed by the body.

Any amorphous sugar can be used, but the present preferred embodiments include the use of amorphous shearform product. The shearform product of the present invention can be made on machines such as those set forth and described in U.S. Pat. Nos. 5,427,811 and 5,447,423, incorporated herein by reference. In these machines sugar is introduced to a spinner head in which it is subjected to heat and shear created by centrifugal force from the spinning heat. Other disclosures relating to spinning substances include U. S. Pat. Nos. 4,855,326, 4,873,085, 5,034,421, 4,997,856, and 5,028,632. Examples in the U.S. Patents listed above describe processing feedstock material by subjecting it to high-speed spinning on a spinning head in which the substance is also subjected to heating by a heating element.

More recently, commonly owned U.S. Pat. No. 5,380,473, entitled "Process for Making Shearform Matrix," discloses another process for making shearform matrix by subjecting non-solubilized feedstock to heat sufficient to induce internal flow, ejecting a stream of the feedstock while possessing internal flow, and then subjecting it to disruptive fluid shear force, which separates it into separate parts or masses having a transformed morphology. The product is amorphous. Other ingredients can be included in the material so that when it is used in the present invention co-crystallization will occur.

The amorphous sugar, with or without the additive, is then contacted with a fractional amount of a non-aqueous sugar-nondissoluble liquid which acts as a crystallization promoter. A preferred non-aqueous sugar-nondissoluble liquid used in the present invention is ethanol. The crystallization promoter is presented to the amorphous sugar at a rate and in an amount which permits the mesomorphic polycrystallite growth. Advantageously, the crystallization promoter is added at a relatively small weight fraction of the sugar to be crystallized, preferably on the order of about 25% or more desirably, about 10% or less, such as about 5% or even less. This represents as much as a 100 fold or even greater reduction in the amount of promoter previously thought necessary for crystallization. The above percentage can be even less when the non-solvent crystallization promotor is in the form of a gaseous vapor. Thus, it is possible to utilize as little as about 1 wt % or even less of crystallization promoter to crystallize the amorphous sugar feedstock.

Fondant compositions that include either the mesomorphic polycrystallites or the crystallites, or a combination of both, are used as cream centers for candy, toppings, e.g., for ice cream and fillings and/or coatings for baked goods. Additional ingredients which generally preserve the organoleptic properties of the compositions can include gums, humectants, fats, and flavors (including sweeteners). Other ingredients may be used, and the present invention is intended to include all such compositions that incorporate the mesomorphic sugar material and/or crystallites.

Gums are generally considered carbohydrate polymers of high molecular weight and include both natural gums and mucilages such as, for example, acacia, agar, alginic acid, carrageenan, guar gum, guaiac gum, karaya gum, tragacanth gum, xanthan gum, locust bean gum, and alginates, e.g., calcium alginate, potassium alginate, and sodium alginate. Gums also refer to cellulosic gums which include, for example, hydroxypropyl methylcellulose, hydroxethyl cellulose, methyl cellulose, carboxymethyl cellulose, and hydroxymethyl cellulose.

Humectants are considered those agents which retain or help to retain moisture in foods and include, for example, glycerine, potassium polymetaphosphate, propylene glycol, polyethylene glycol, sodium chloride, sorbitol, invert sugar, and glycerol triacetate (triacetin), corn syrup and corn syrup solids.

Fats are another class of ingredients which can be used in the compositions of the present invention and generally include, for example, mono-, di-, and tri-glyceryl esters of higher chain fatty acids, e.g., stearic and palmitic, or mixtures thereof, and can be solid or liquid. Fats can be derived from plant or animal sources, or can be produced by synthetic methods.

With respect to flavorants, the compositions of the present invention include, but are not limited to, natural or synthetic oil or water-based flavors such as spices, non-acid flavors, essential oils, oleoresins, essences and extractives. The flavorants also include sweeteners.

Flavors are added in flavor-affecting amounts, e.g., up to about 2 wt %. As non-limiting examples, the flavorants include natural or synthetic flavors such as chocolate or vanilla; fruit flavors such as raspberry, strawberry, cherry, apple, pear, plum, peach, apricot, citrus such as orange, lemon and lime; mint flavors such as peppermint, spearmint and wintergreen; eucalyptus; spice flavors such as clove, nutmeg, cinnamon, anise, ginger; nut oils such as almond; and other flavors such as peanut, coffee, and liqueur flavorings.

Sweeteners can be natural or synthetic and include disaccharides, monosaccharides and their degradation products, including, for example, sucrose, maltodextrins, lactose, fructose, maltose, dextrose (glucose), invert sugar (a mixture of glucose and fructose), corn syrups, other 20 syrups such as cane, molasses, maple, syrups derived from fruit (e.g., apple, peach, pear, citrus, grape), honey; low-calorie sweeteners such as sorbitol or other polyhydric alcohols, saccharin, aspartame, acesulfame-K, thaumatin, and neohespiridine dihydrochalcone.

Alkalized or non-alkalized cocoa powder can be added to provide color and/or flavor.

As a result of the present invention an entirely new physical or structural form for sugar has been provided. This mesomorphic form has been found to be extremely useful in products which require a uniform crystal sugar product. For example, a fondant consisting of substantially mesomorphic polycrystallite structures can be prepared. In yet a further preferred embodiment a fondant product can be prepared which uses monodispersed sugar crystallites. The resulting product is amazingly smooth and flowable, and has an entirely different microscopic composition from any known fondant product.

Fondant can be generally described as masses of very small sugar crystals surrounded by syrup. One exemplary type of fondant is a soft, creamy candy made of sugar which is normally used as a filling for other candies.

The mesomorphic sugar of the present invention has a truly unique capability of building the viscosity of a fondant composition at a relatively low sugar concentration. For example, if it is normally necessary to include 67 wt % of commercially-available fondant sugar to achieve the correct viscosity in a fondant, only about 37 wt % (or about one-half the amount of the commercial fondant sugar) of the mesomorphic sugar is required to achieve the same. This is a truly remarkable effect which is further described in the examples.

In one embodiment a fondant composition is prepared by combining mesomorphic sugar, preferably in an amount of from about 30 wt % to about 70 wt %, and more preferably from about 40 wt % to about 60 wt %; sugar syrup, preferably in an amount of from about 20 wt % to about 70 wt %, and more preferably about 30 wt % to about 60 wt %; gum, preferably in an amount of zero to about 10 wt %, and more preferably from about 2 wt % to about 6 wt %; humectant, preferably in an amount from zero to about 10 wt %, and more preferably from about 2 wt % to about 6 wt %; and flavorants including flavors and sweeteners in flavoring and sweetening amounts, for example flavors up to about 2 wt %. Any of the foregoing sugar syrup, gum, humectant and flavorings may be selected from those well known in the art. This formulation is advantageously used, for example, in preparing (e.g., raspberry) cream centers for chocolates or other candies.

Figure 2:
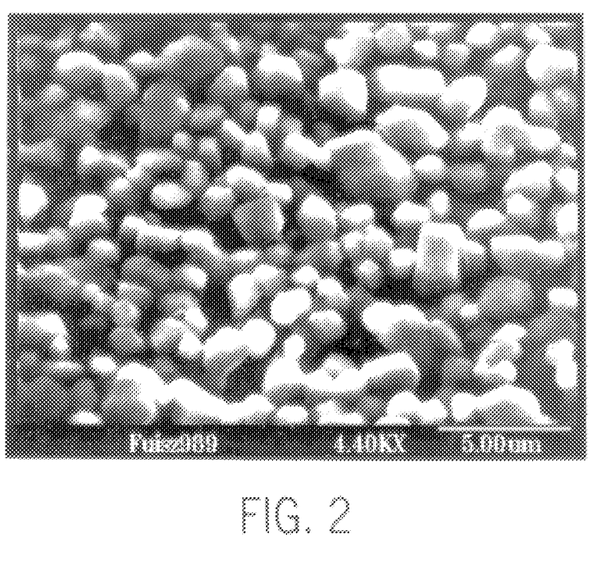
FIG. 2 is a scanning electron micrograph of the monodispersed sugar crystallites produced by disintegrating the mesomorphic sugar product shown in FIG. 1.

Referring now also to FIG. 2, the mesomorphic sugar prepared hereinabove can be then disintegrated by dispersion into crystallites by mixing with a carbohydrate or sugar solution. This action, in turn, yields the monodispersed crystallites illustrated in FIG. 2. The carbohydrate or sugar solution is preferably saturated solution containing sucrose in an amount of from about 60 wt % to about 67 wt %. Some or all of the sucrose can be substituted for with other sugars such as dextrose and/or fructose. Bob syrup can be used. Especially desirable is a high fructose corn syrup solution, for example, marketed under the trademark Isoclear 55. A combination solution of sucrose and high fructose corn syrup is highly desirable. The sugar saturation of the solution may be varied to obtain softer or firmer consistencies thereof, for use in such products as fondants. For example, the use of a 60 wt % sugar solution will yield a soft fondant product suitable for ice cream toppings. The use of a 67 wt % sugar solution will yield a firmer fondant product suitable for cookie filling. The softer or firmer consistency of the fondant can also be varied by using more or less sugar solution in proportion to the amount of polycrystallites added. The optimal proportions for any product can easily be determined by the skilled artisan, and the invention is intended to encompass such proportions.

A fondant composition can be prepared as follows: Optionally, gum is added to the water for the sugar solution, preferably at a slightly elevated temperature, e.g., about 80° C. Sugar is added to form the sugar solution. The mesomorphic sugar containing the polycrystallites and remaining ingredients are mixed with the sugar solution. The flavor may be added last to maintain its integrity. A humectant, such as glycerine, may also be included to maintain storage stability, and prevent degradation of the resulting fondant. The fondant composition can then be packaged or used in confections.

One preferred fondant composition (having monodispersed polycrystallites) will therefore include about 40–70 wt %, more preferably about 50–60 wt % of crystallized mesomorphic sugar product combined with about 15–30% sugar solution (a 2:1 mixture of high fructose corn syrup and 60–67 wt % sucrose solution with optional food color), humectant within the range of about 0–30 wt %, and flavoring within the range of about 0–10 wt %. Preferred flavorings can include raspberry or a combination of chocolate and low-fat cocoa powder. The resultant mixture is very suitable, for example, as a cream center or centerfill for chocolates, having the taste and mouthfeel of a high fat composition.

As a result of the present invention a new fat mimetic ingredient is provided for us in foods, e.g., fondants, frosting, fillers for baked goods—especially chocolate cream centers, cookie fillers, etc. A further manifestation of the present invention is a comestible composition, i.e., a fondant which can be used as a cream center for chocolates or other candy, a topping, e.g., for ice cream, pudding and custard, and a coating or filler for baked goods. Coatings and fillers, as used herein, mean a non-baked portion of an edible product such as cookie fillings, cake fillings (e.g., fillings for TWINKLES®, etc.), icings, and other coatings. These comestible compositions include either the mesomorphic polycrystallite material or crystallites, or both, and, optionally, other ingredients which preserve organoleptic properties, e.g., texture, moisture level, prevention of crystallization, etc. Additional ingredients employed to achieve the preservation or adjust properties of the comestible compositions include, but are not limited to, gums, humectants, fats, and flavors (including sweeteners). The present invention includes these compositions.

In another embodiment, cocoa powder is added to the fondant composition described above. The cocoa powder is preferably in an amount of from about 3 wt % to about 20 wt %, and more preferably from about 5 wt % to about 14 wt %. An emulsifying fat is optionally added in an amount of from about zero to about 30 wt %. This formulation is advantageously used to provide water-based, non-fat, reduced calorie chocolate substitute. A superior chocolate product is obtained, for example, by adding up to 30 wt % cocoa butter.

A nut butter can also be mixed with the fondant of the invention. A preferred nut butter is peanut butter, but other nuts may be used such as almonds, chestnuts, coconuts, pecans, pistachios, and walnuts. Generally, peanut butter contains at least 90 wt % peanuts and the remaining 10 wt % or less can be salt, sweetener (sugar or molasses) and/or an emulsifier, e.g., partially hydrogenated vegetable oil. However, reduced fat, reduced calorie peanut butter can be prepared.

In another embodiment nut butter, preferably in an amount from about 15 wt % to about 60 wt %, and more preferably from about 25 wt % to about 45 wt %, is added to the fondant composition described above. The fondant composition, preferably in an amount of from about 40 wt % to about 85 wt %, and more preferably about 55 wt % to about 75 wt %, is mixed with nut butter. Salt is optionally added, preferably in an amount from zero to about 3 wt %, and more preferably about 0.5 wt % to about 1.5 wt %. A preferred nut butter is peanut butter.

Moreover, an extremely efficient tableting vehicle is provided. Active agent can be incorporated into the mesomorphic product and the mesomorphic product (with or without active agent) can be used as an excipient.

The present invention has uniquely harnessed the natural drive of matter to seek and maintain a lower energy state to create a process for controlled crystalline growth as well as a new product resulting therefrom. Material which has a natural crystalline structure in its lowest entropy state is transformed to an increased entropy state when it is made amorphous. In the amorphous condition the material possesses a natural tendency to transform to a lower energy state, i.e., the crystalline form of the material. The inventors herein have harnessed this natural tendency of matter to drive the crystallization process with exquisite control and precision. This has been achieved by providing an essentially nonsolvent system in which a fractional amount of a crystallization promoter is made available to induce controlled crystallization to the mesomorphic state. The variety of procedures and products resulting from harnessing the tendency of natural systems to seek their lowest entropy states is boundless, and the present claims cover any procedures which utilizes the principles set forth herein.

EXAMPLES

In the following examples amorphous sugar is provided by spinning granulated sucrose in a spinning machine operated at about 205°–225° C. and spun at a rate of about 3600 rpm. The product has the form of a sugar floss. The volume of the floss is then reduced by subjecting it to processing in a high-speed mixer to break the fibers into smaller pieces.

Example 1

One hundred grams (100 g) of sucrose shearform matrix floss (amorphous sugar) is contacted with 10 g (~10 mL) absolute ethanol by dropwise addition of the ethanol to the floss in a mixing bowl while stirring with a low-speed mixer for about 10 minutes. A mesomorphic polycrystallite sugar product is produced with substantial evolution of heat. Much of the ethanol is driven off during mixing, with the remainder removed by warming the product at about 50° C. for about 30 minutes in an oven.

Example 2 (Comparative Example)

A spheroidal sugar product is made according to the method described in U.S. Pat. No. 5,518,551 by adding 10 g sucrose floss to 150 mL of an ethanol/water mixture. The product is obtained by decanting the excess ethanol and water, followed by drying the product by heating at 50° C. for six hours in an oven.

Example 3

A mesomorphic product of the invention as described in Example 1, and a spheroidal product as described in Example 2, are used to make separate fondant compositions using the same recipe. The resulting fondant products are compared for taste and texture by a panel of trained tasters. The fondant prepared from the mesomorphic sugar product of the invention has a sweeter taste with substantially fewer off-notes typically associated with organic solvents.

Example 4

One hundred grams (100 g) sucrose shearform matrix floss (amorphous sugar) is contacted with 10 g (~10 mL) acetone by dropwise addition of the acetone to the floss in a mixing bowl while stirring with a low-speed mixer for about 10 minutes. A mesomorphic polycrystallite sugar product is thereby produced with substantial evolution of heat. Much of the acetone is driven off during mixing, with the remainder removed by warming the product at about 50° C. for about 30 minutes in an oven.

Example 5

One hundred grams (100 g) sucrose shearform floss (amorphous sugar) is contacted with 10 g (~10 mL) benzene by dropwise addition of the benzene to the floss in a mixing bowl while stirring with a low-speed mixer for about 10 minutes. A mesomorphic polycrystallite sugar product is produced with substantial evolution of heat. Much of the benzene is driven off during mixing, with the remainder removed by warming the product at about 50° C. for about 30 minutes in an oven. Again, the unique crystallization occurs, but at a rate somewhat slower than occurs when using ethanol as the crystallization promoter. It takes about three (#) weeks to obtain maximum crystallization.

Example 6

A further experiment is conducted in which 0.5 wt % of a surfactant (lecithin) is used as part of the sugar stock which was processed to form the amorphous sugar feedstock. The material is processed using a high-speed spinning apparatus at a temperature of about 205°–225° C. and a spinning speed of about 3600 rpm. The product resulting from the flash flow procedure set forth above has the appearance of cotton candy.

A 100 g sample of floss is contacted with 10 g ethanol at room temperature and mixed for about 10 minutes. The results indicate a mesomorphic polycrystallite structure that does not tend to aggregate. In fact, the polycrystallites are on the order of about 10 μm. The tendency to aggregate is inherent in the growth of sugar crystals. The use of the surfactant reduces the tendency to aggregate.

Example 7

To produce crystallites from the mesomorphic polycrystallite structures prepared in accordance with the examples set forth above, water which has been previously essentially saturated with sucrose is contacted with the mesomorphic polycrystallite structures. In one case saturated water is provided with an approximately 67 wt % sucrose content. Water with 67 wt % sucrose is essentially sugar saturated. As a result of contacting saturated water solution with the polycrystallite product, the polycrystallite disintegrates, dispersing the crystallites throughout the solution. The crystallites are made available for use in the solution as a monodispersed crystallite product to impart smooth far-like mouth feel to comestible products into which they are incorporated.

Example 8

Another experiment is conducted in which a polycrystallite product was added to 8.5 wt % water. The polycrystallite structures are disintegrated, releasing the crystallites into the composition. A fondant product prepared using crystallites of the present invention has a substantially smoother consistency than a fondant prepared with commercial fondant sugar. The smoothness and fineness of the product made with the crystallites obtained from the mesomorphic product of the invention is immediately perceptible and is much preferred for purposes of smoothness and flowability in a fondant composition.

Example 9

Examples of fondant cremes were prepared by addition of water to the unique polycrystallite sugar prepared in accordance with the present invention and compared to fondant cremes prepared from commercial sugar supplied as AMERFOND® sugar. Both fondant cremes were prepared by using other fondant ingredients in accordance with the table set forth below.

FONDANT TABLE 1

| INGREDIENT (g) | INVENTIVE FONDANT | COMMERCIAL FONDANT |
| --- | --- | --- |
| Corn Syrup | 14.00 | 14.00 |
| Flavor, Raspberry | 0.36 | 0.36 |
| Citric Acid | 0.80 | 0.80 |
| Invertase | 0.61 | 0.61 |
| Color, Red (10%) | Trace | Trace |

Water was added in order to achieve the correct viscosity for preparing fondant-containing confections, i.e., chocolate coated fondant candy.

Surprisingly, it was found that the amount of inventive sugar required to obtain the correct viscosity was about 50% of the amount of commercial sugar required to achieve the same viscosity. In particular, it was found that only about 37 g of the inventive sugar was required to attain a viscosity of about 1.8 centipoises, whereas about 67 g of the commercial sugar was required to attain the same viscosity.

The compositions were prepared by dry mixing the ingredients and then adding water while mixing. Water was added until the consistency of the composition attained a creamy smoothness. The fondant composition was then allowed to set before rolling and permitting to become firm.

Another interesting and unusual result was the discovery that the creme prepared with the inventive sugar required only 15 minutes to set to a firmness sufficient to handle, whereas the fondant creme prepared with the commercial sugar required 30 minutes to set sufficiently for handling and dipping.

The cremes were then processed by dipping into chocolate. The cremes prepared with the sugar product of the present invention better retained shape while dipping. Moreover, immediately after the cremes were produced, the inventive cremes had a smoother texture that was retained over at least a five-day period.

The results of the fondant experiments were striking in that the amount of sugar required as well as the product itself were significantly enhanced by use of the polycrystallite sugar of the present invention.

Example 10

Additional fondants were prepared by using ingredients in accordance with Fondant Table 2, below:

FONDANT TABLE 2

| INGREDIENT | QUANTITY (%) | QUANTITY (g) |
| --- | --- | --- |
| Polycrystallites | 54.35 | 434.80 |
| Sucrose Solution (64 wt %) | 45.65 | 365.20 |
| Flavor | 0.75 | 6.00 |
| Color | 0.22 | 1.76 |

The compositions were prepared by dissolving the coloring in the sucrose solution (slightly warmed), then adding the remainder of the ingredients while mixing. The fondant prepared according to Table 3 included extra polycrystallites. The fondant compositions were allowed to set before rolling.

Example 11

Another composition was prepared by using ingredients in accordance with Fondant Table 4, set forth below:

FONDANT TABLE 4

| INGREDIENT | QUANTITY (WT %) | QUANTITY (g) |
| --- | --- | --- |
| Polycrystallites | 50.00 | 100.00 |
| Sucrose Solution (60 wt %) | 41.00 | 82.00 |
| Defatted Cocoa Powder | 5.00 | 10.00 |
| Glycerine (99%) | 2.50 | 5.00 |
| Flavor, Chocolate | 1.00 | 2.00 |
| Kelgin LV Soluble Gum | 0.50 | 1.00 |

The composition of Table 4 is a non-fat chocolate replacement which can be used in confections. The use of the polycrystallites of the invention results in the mouth feel of fat while avoiding the use of fat.

Example 11A

Another composition was prepared by using ingredients in accordance with Fondant Table 5, set forth below:

FONDANT TABLE 5

| INGREDIENT | QUANTITY (WT %) | QUANTITY (g) |
| --- | --- | --- |
| Polycrystallites | 54.65 | 327.90 |
| Sucrose Solution (67 wt %) incl. Red Food Color | 22.60 | 135.60 |
| Glycerine (99%) | 22.00 | 132.00 |
| Flavor, Raspberry | 0.75 | 4.50 |

Example 11B

This example was identical to Example 11A above, with the exception that high fructose corn syrup was substituted for the sucrose solution.

Example 11C

This example was identical to Example 11B above, with the exception that chocolate flavor replaced raspberry flavor, and low fat cocoa powder comprised approximately 4% of the final fondant, with a corresponding reduction in the amount of high fructose corn syrup utilized.

Example 12
Fat Mimetic Examples

Examples were also prepared in order to test the efficacy of the polycrystallite sugar used in a confectionery filling which relies on fat as a medium for the organoleptic quality of the product. In particular, cookie fillings typically include fat to provide the texture, firmness, quality, and mouth fee necessary to be palatable and commercially saleable as a cookie filling.

To test a cookie filling prepared with the present invention a formulation was prepared which included a total of 84.94 wt % sucrose. To prepare this composition 35 g of the mesomorphic polycrystallite product was combined with 29.4 g of a saturated sucrose solution. The saturated sucrose solution contained 30.59 g sucrose and 15.06 g water, i.e., 67 wt % sucrose.

Samples, 4.8 g each, were used to provide a filler between two OREO® cookie halves. The cookies prepared in accordance with the present invention were tasted by a taste panel. The results revealed that the cookies prepared with the polycrystallites of the present invention had a much cleaner mouth feel and were smoother and creamier than the normal OREO® cookie filling. The commercial OREO® cookie filling contains a great deal of fat. The composition of the present invention includes no fat.

Consequently, confectionery fillings for products can be prepared using the new crystals of the present invention and to eliminate or replace fat in such fillings. Other and further uses will be apparent to those skilled in the art, and it is intended to include all such other uses as come within the scope of the present invention.

Example 13

Further experiments were run to compare cake icings prepared with the mesomorphic polycrystallite sugar of the present invention against commercial icings. Cake icing was prepared in accordance with the formulas in the table set forth below:

CAKE ICING

| INGREDIENT (g) | INVENTIVE ICING | COMMERCIAL ICING |
| --- | --- | --- |
| Commercial Fondant Sugar | — | 227.0 |
| Inventive Sugar | 227.0 | — |
| Corn Syrup, 42 DE | 9.0 | 9.0 |
| Agar | 1.18 | 1.18 |
| Simple Syrup 66 Brix. Soln. | 220.0 | 190.0 |

The sugars were placed in separate mixing vessels and blended with agar, after which the corn syrup was added. The simple sugar solutions were then added until the desired consistency was achieved. As has been noted before, the compositions prepared with the polycrystallite of the present invention required additional simple syrup because of the capacity of the polycrystallite to include more water. The yield of icing was at least 7% greater using the polycrystallite sugar of the present invention. Thus, significantly less sugar is required when using the present invention.

The product using the polycrystallite sugar of the present invention was whiter, cleaner tasting, smoother texture, and had a high yield when compared to the commercial counterpart. It has been found that high quality fondant and fondant products can be produced without the requirement of making a fondant using conventional cooking, cooling, and pulling equipment. Mere mixing in correct proportions has been found to be adequate to prepare a high quality product using the present invention.

Example 14

To show the efficacy of the present invention in various comestible forms, experiments are run to confirm its usefulness in tableting. In particular, 500 mg samples of the mesomorphic polycrystallite sugar product are added to a tablet press and pressed under 1.5 tons of pressure. Tablets are formed directly from the mesomorphic polycrystallite product without the need for an additional excipient or, for that matter, any other tableting aid or vehicle.

The tablets formed are glossy and hard. When consumed, however, the hard tablets dissolve quickly in the oral cavity.

It appears that the polycrystallite product prepared in accordance with the present invention can be tableted directly without the need for a tableting aid. Moreover, tableting the new product requires neither wet or dry granulation nor agglomeration. Thus, the mesomorphic polycrystallite product can be used directly to provide tablets or, indeed, as an excipient for preparing tablets with other materials.

The ready dissolution which occurs in the oral cavity is probably attributable to the unique and extraordinarily small polycrystallite structure; however, it is not intended that the present invention is in any way limited by the hypotheses set forth herein.

Finally, it is also within the scope of the invention according to a further embodiment that amorphous sugar be crystallized in the presence of a non-solvent crystallization promoter as heretofore described, but only partially so. In other words, only partial transformation of the amorphous saccharide material to the mesomorphic crystalline structure is allowed to take place before the partially crystallized mass is inserted into a tablet press or other known device, and is then formed into a tablet. Crystallization may continue at this point, but the resulting tablet will typically have both amorphous and mesomorphic morphologies present in its structure in the final tablet form.

Thus, while there have been described what are presently believed to be the preferred embodiments of the present invention, those skilled in the art will appreciate that other and further modifications can be made without departing from the true scope of the invention, and it is intended to include all such modifications and changes as come within the scope of the claims as appended herein.

What is claimed is:

1. A method of making a sugar product comprising contacting amorphous sugar with a nonsolvent crystallization promoter substantially without any added sugar solvent, said crystallization promoter made available to said amorphous sugar at a rate and in an amount which is less than about 50 weight per cent of the amorphous sugar so as to provide a mesomorphic sugar having randomized polycrystallite structure.

2. A method according to claim 1 further comprising providing said amorphous sugar by flash-flow processing a sugar-containing feedstock.

3. A method according to claim 2 wherein said flash-flow processing comprises subjecting a feedstock having a sugar carrier to shear created by high-speed spinning on a spinning head which casts material outwardly, said feedstock subjected to heating and shear in said head sufficient to create flash flow in said sugar carrier.

4. A method according to claim 2 wherein said flash-flow processing comprises heating a non-solubilized feedstock having a sugar carrier sufficiently to provide internal flow in said sugar carrier, ejecting said feedstock while said sugar has said internal flow condition, and subjecting said feedstock to disruptive fluid shear force to form multiple masses of carrier.

5. A method according to claim 2 wherein said feedstock further comprises a surfactant.

6. A method according to claim 1 wherein said amorphous sugar further comprises an additive whereby said additive is co-crystallized in said randomized polycrystallite structures.

7. A method according to claim 6 wherein said additive is a material which can be integrated into said amorphous sugar without reducing the amorphism of said sugar and without deteriorating said randomized polycrystallite structures.

8. A method according to claim 7 wherein said additive is selected from the group consisting of flavorants, bio-affecting agents, dyes, fragrances, food products, food ingredients, and other compatible substances.

9. A method according to claim 1 wherein said crystallization promoter further comprises an additive that co-crystallizes with said sugar to form said mesomorphic polycrystallite structures.

10. A method according to claim 9 wherein said additive is selected from the group consisting of flavorants, bio-affecting agents, dyes, fragrances, food products, food ingredients, and other compatible substances.

11. A method according to claim 10 wherein said additive is a bio-affecting agent selected from inhalants.

12. A method according to claim 11 wherein the mean diameter of said randomized polycrystallite structures are no greater than about 200° $\mu$m.

13. A method according to claim 1 wherein said crystallization promoter is maintained at a temperature of no less than about −20° C.

14. A method according to claim 1 wherein said crystallization promoter is ethanol.

15. A method according to claim 1 further comprising disintegrating said mesomorphic polycrystallite structures to form crystallites.

16. A method according to claim 15 wherein said disintegrating comprises contacting said mesomorphic polycrystallite structures with an essentially sugar-saturated aqueous liquid.

17. A method according to claim 15 wherein said crystallites have an average crystal diameter no greater than about 10 $\mu$m.

18. A method according to claim 17 wherein said crystallites have an average crystal diameter no greater than about 5 $\mu$m.

19. A mesomorphic sugar product consisting of a randomized polycrystallite structure comprising a multiplicity of sugar crystallites.

20. A mesomorphic sugar product according to claim 19 wherein said randomized polycrystallite structure is produced by contacting amorphous sugar with a crystallization promoter substantially free of solvent, wherein said crystallization promoter is made available to said amorphous sugar at a rate and in an amount sufficient to form said randomized polycrystallite structure.

21. A mesomorphic sugar product according to claim 20 wherein said amorphous sugar is a shearform product.

22. A mesomorphic sugar product according to claim 21 wherein said crystallization promoter is ethanol.

23. A mesomorphic sugar product according to claim 19 wherein said sugar crystallites are microcrystalline.

24. A mesomorphic sugar product according to claim 23 wherein said microcrystalline sugar crystallites have an average crystal size of no greater than about 10 $\mu$m.

25. A mesomorphic sugar product according to claim 24 wherein said microcrystalline sugar crystallites have an average crystal size of no greater than about 5 $\mu$m.

26. A mesomorphic sugar product according to claim 19 further comprising an additive co-crystallized in said crystallites.

27. A mesomorphic sugar product according to claim 26 wherein said additive is selected from the group consisting of flavorants, bio-affecting agents, dyes, fragrances, food products, food ingredients, and other compatible agents.

28. Monodispersed sugar crystallites produced by disintegrating a sugar product having a mesomorphic polycrystallite structure.

29. Monodispersed sugar crystallites according to claim 28 wherein said mesomorphic polycrystallite structure is prepared by contacting amorphous sugar with a crystallization promoter substantially free of solvent, wherein said crystallization promoter is made available to said amorphous sugar at a rate and in an amount sufficient to form said structure.

30. Monodispersed sugar crystallites according to claim 29 wherein said disintegrating comprises contacting said mesomorphic polycrystallite structures with an essentially sugar-saturated liquid.

* * * * *